United States Patent
Weaver

(10) Patent No.: US 7,447,413 B1
(45) Date of Patent: Nov. 4, 2008

(54) FIBER DROP RECEIVING DEVICE

(75) Inventor: Patrick Allen Weaver, Baden, PA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 11/966,732

(22) Filed: Dec. 28, 2007

(51) Int. Cl.
*G02B 6/00* (2006.01)
(52) U.S. Cl. .................................. 385/135
(58) Field of Classification Search ............. 385/135
See application file for complete search history.

(56) References Cited

U.S. PATENT DOCUMENTS 5,703,990 A * 12/1997 Robertson et al. ........... 385/135
6,377,735 B1 * 4/2002 Bernstein et al. ............ 385/100

* cited by examiner

*Primary Examiner*—Michelle R. Connelly-Cushwa
*Assistant Examiner*—Chris Chu

(57) ABSTRACT

An optical fiber drop receiving device may include a housing assembly including a duct entry port for receiving a drop conduit. A drop receiving cylinder may be rotatably mounted in the housing assembly and connected to the duct entry port. The drop receiving cylinder may be configured to receive a fiber drop and a flow of pressurized air from the duct entry port. The drop receiving cylinder may include an escape port for providing an outlet for the flow of pressurized air. The flow of pressurized air through the escape port may cause the drop receiving cylinder to rotate within the housing assembly. The rotation of the drop receiving cylinder may enable winding of the received fiber drop inside the drop receiving cylinder.

23 Claims, 8 Drawing Sheets

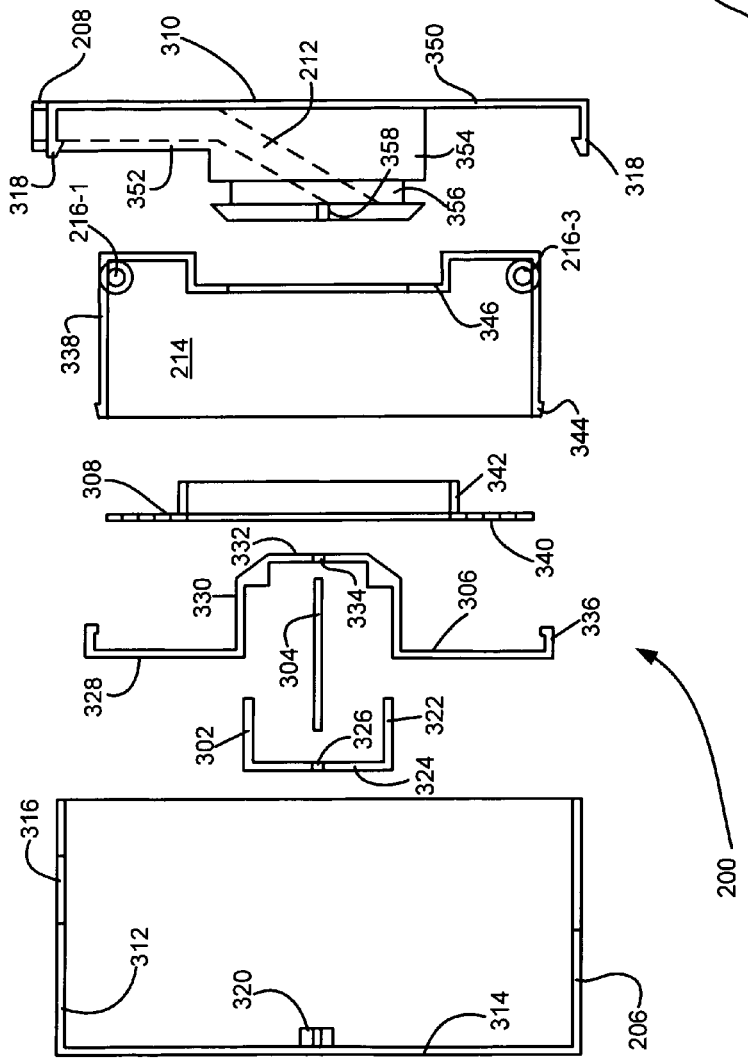

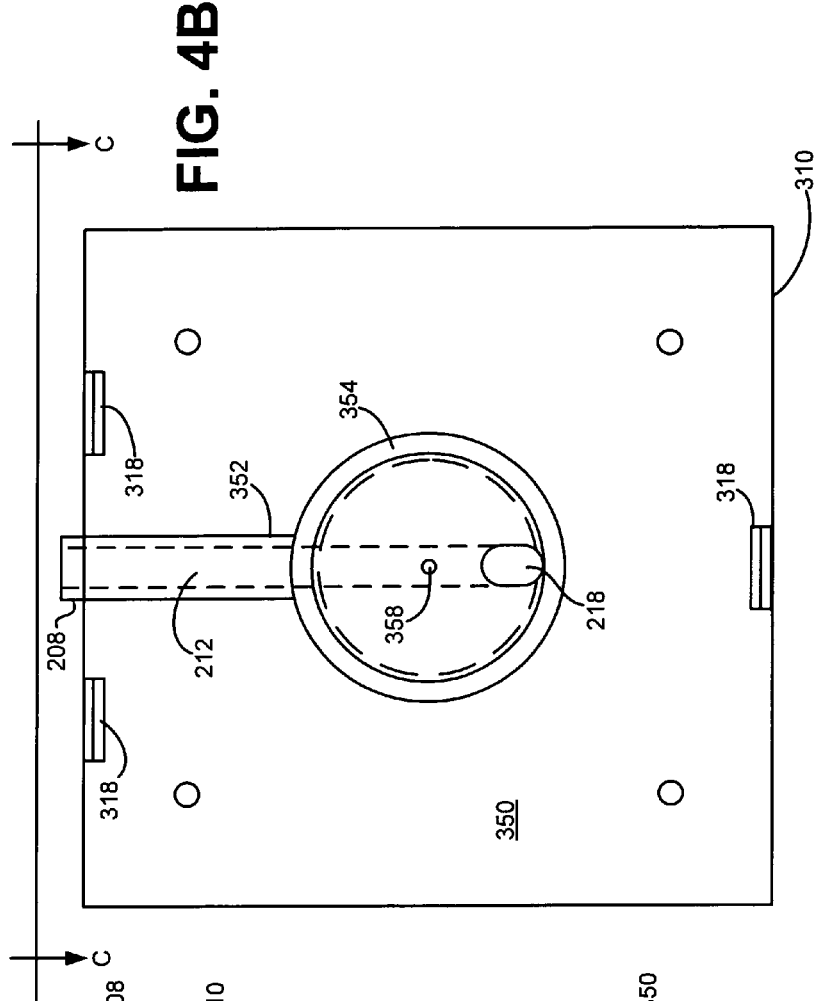
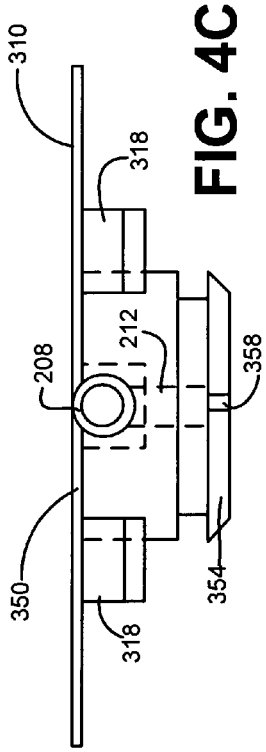
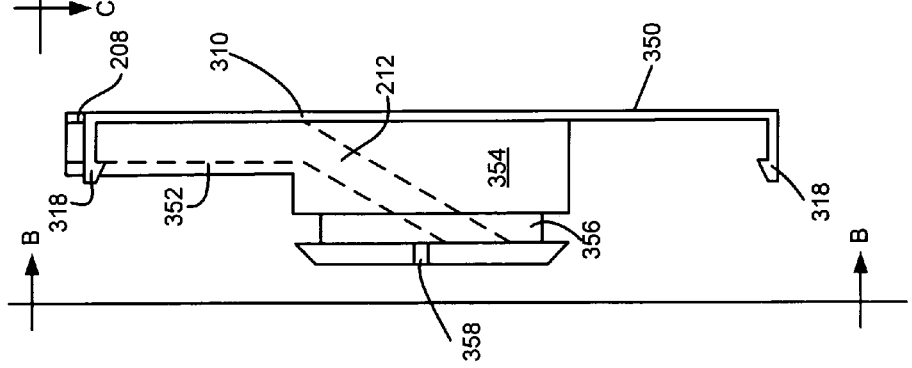

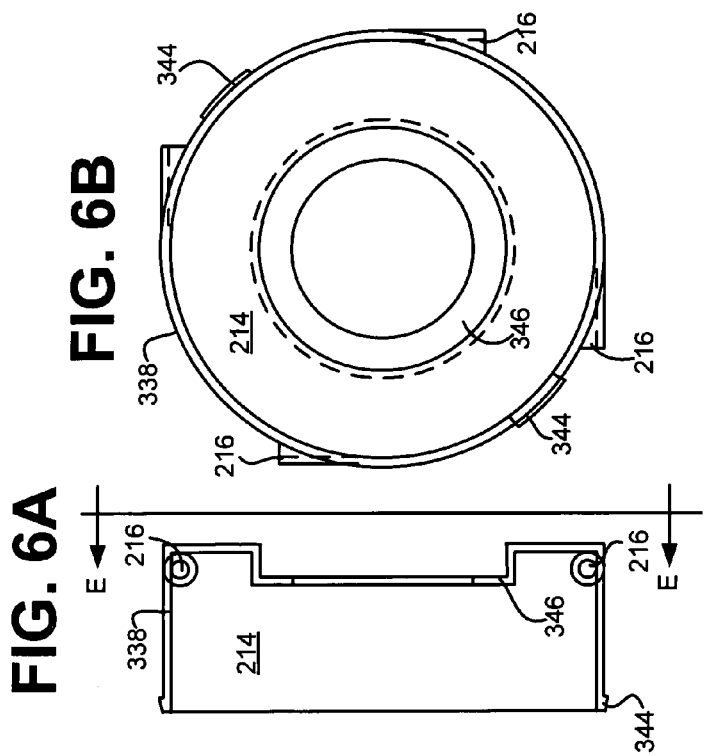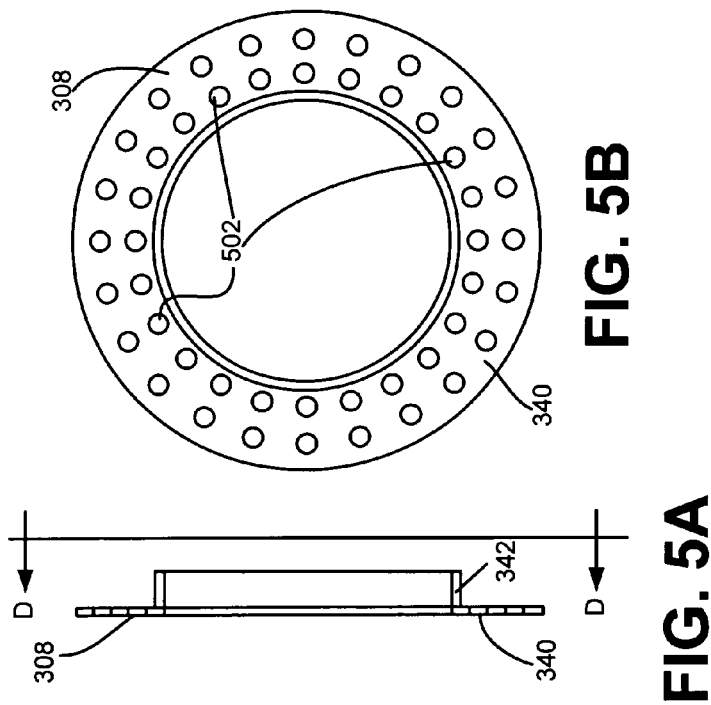

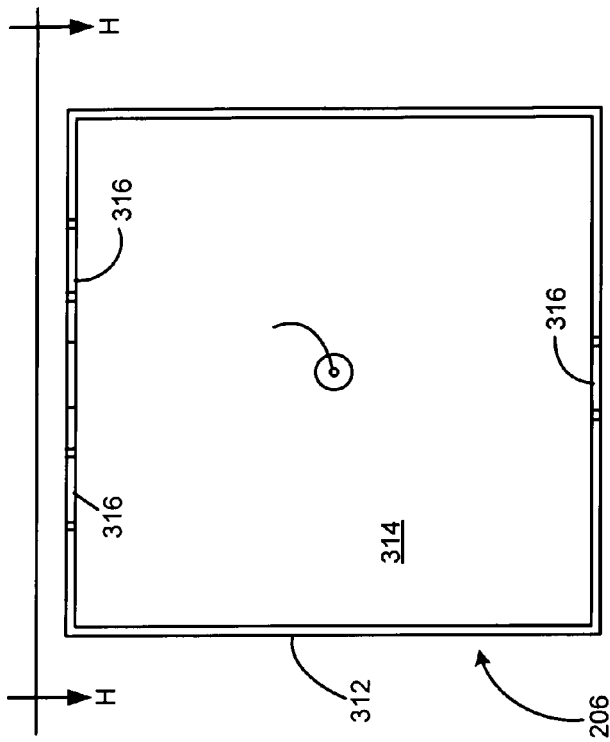
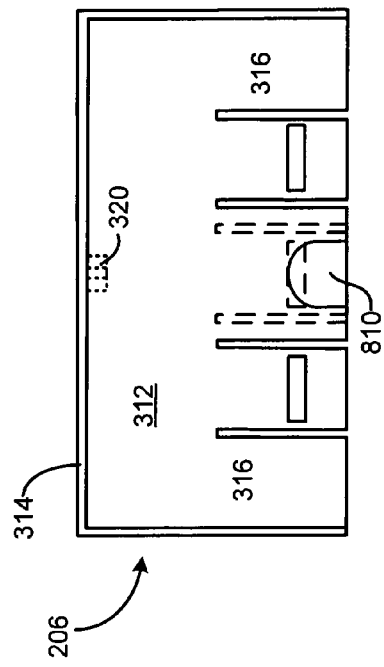
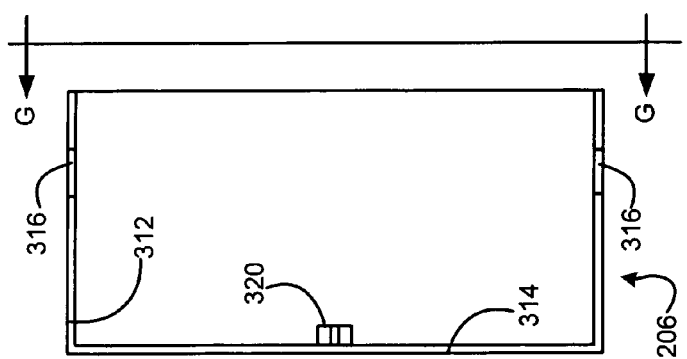
FIG. 8B
FIG. 8C
FIG. 8A

FIBER DROP RECEIVING DEVICE

BACKGROUND

In fiber optic transmission systems, signals are transmitted along lengths of optical fiber by light waves generated from a source thereof, such as a laser. Optical fibers are typically fabricated of glass materials and are very delicate or fragile. An optical fiber may be on the order of 125 microns in diameter or smaller.

In some fiber optic transmission systems, lengths of fiber optic cables or "drops" must be installed through ducts, conduits, or the like. For example, when providing service to individual units in a multi-unit dwelling (e.g., an apartment building), a fiber drop must be placed at each individual unit in a multi-unit dwelling. This is typically accomplished by placing a conduit or duct from a central service provision location to a predetermined location in each individual unit that happens to be served by that location. The duct may be placed at either the time of the initial construction or at the time that the service order is placed.

Regardless of the time at which the duct is installed, prior to initiating service to a particular unit, a fiber optic drop is placed within the duct from the terminal to the particular unit. This is typically accomplished by pulling the drop through the duct using a nylon string. Unfortunately, this operation typically requires access to the customer premises at the time of installation and may require two or more individuals to perform the operation.

BRIEF DESCRIPTION OF THE DRAWINGS

FIGS. 3A and 3B are exploded and assembled schematic views of the drop receiving device of FIG. 1 taken along the line "A-A";

FIG. 4A is a schematic diagram of the back plate of FIG. 3A;

FIG. 4B is a schematic diagram of the back plate of FIG. 4A taken along the line "B-B";

FIG. 4C is a schematic diagram of the back plate of FIG. 4B taken along the line "C-C";

FIG. 5A is a schematic diagram of the shield of FIG. 3A;

FIG. 5B is a schematic diagram of the shield of FIG. 5A taken along the line "D-D";

FIG. 6A is a schematic diagram of the drop receiving cylinder of FIG. 3A;

FIG. 6B is a schematic diagram of the drop receiving cylinder of FIG. 6A taken along the line "E-E";

FIG. 8A is a schematic diagram of the outer housing of FIG. 3A;

FIG. 8B is a schematic diagram of the outer housing of FIG. 8A taken along the line "G-G";

FIG. 8C is a schematic diagram of the outer housing of FIG. 8B taken along the line "H-H"

DETAILED DESCRIPTION OF PREFERRED EMBODIMENTS

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Devices and methods consistent with aspects described herein provide for efficient installation of lengths of optical fibers within installation conduits. More specifically, a device may be provided for receiving a length of optical fiber from the conduit by using a rotating drop receiving cylinder, to actively receive the length of fiber and facilitate efficient winding of the length of fiber.

Figure 1:
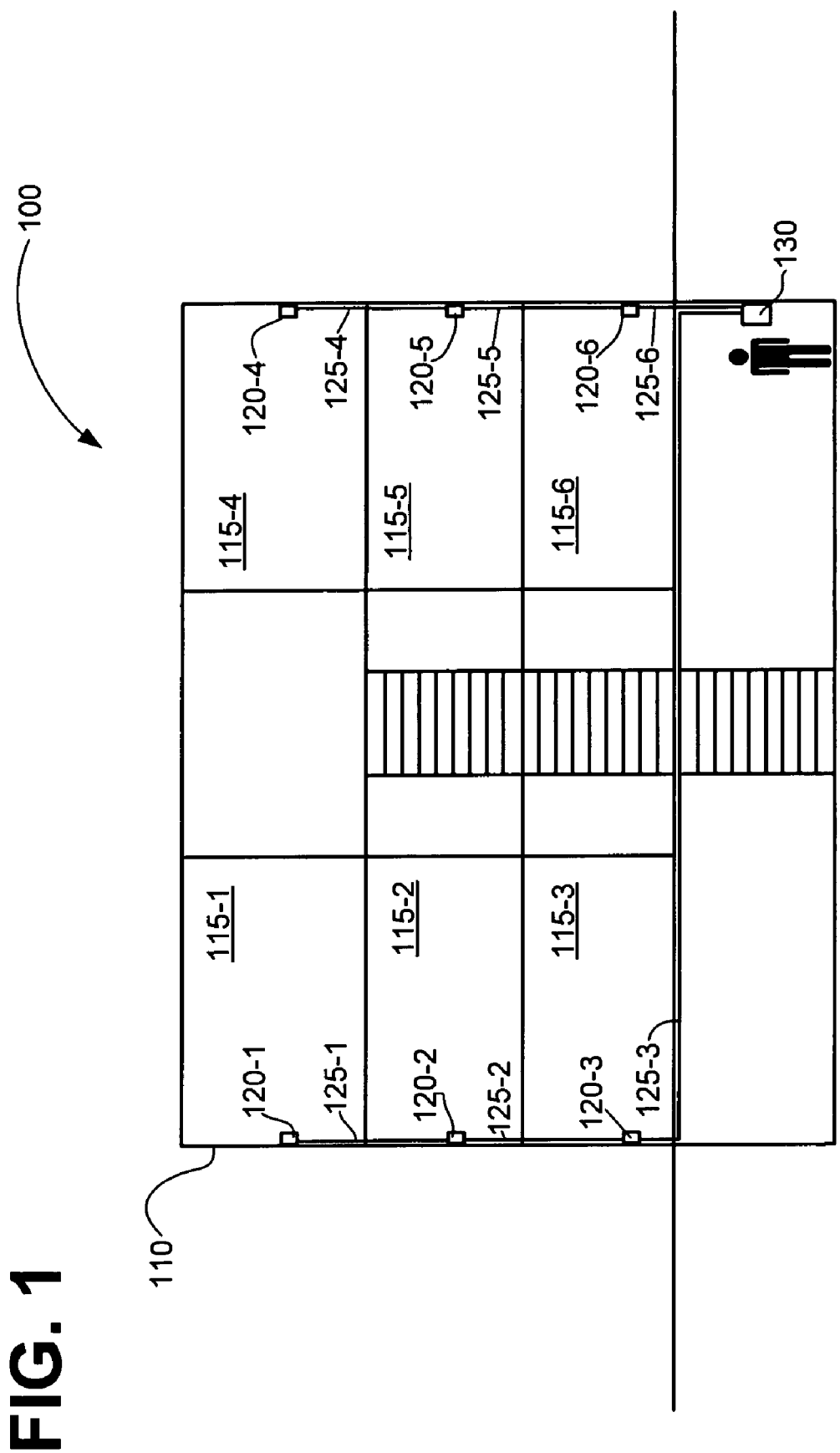
FIG. 1 is a block diagram illustrating an exemplary application environment in which the devices and methods described herein may be implemented.

FIG. 1 is a block diagram illustrating an exemplary application environment 100 in which devices and methods described herein may be implemented. As illustrated, application environment 100 may include a multi-unit building 110, units 115-1 to 115-6, drop receiving devices 120-1 to 120-6, conduits 125-1 to 125-6, and a service provision location 130.

Multi-unit building 110 may include a physical structure, such as an apartment building, having a number of individual units 115-1 through 115-6 (collectively "units 115" or individually "unit 115") provided therein. As described above, each unit 115 may be provided with a corresponding drop receiving device 120-1 to 120-6 (collectively "drop receiving devices 120" or individually "drop receiving device 120") configured to receiving a fiber drop. For example, a utility room or utility closet in each unit 115 may be provided with drop receiving device 120.

In some implementations, drop receiving device 120 may be provided or installed during initial construction of multi-unit building 110 or may be provided during provision of fiber-based services to a particular unit 115 in multi-unit building 110. As will be described in additional detail below with respect to FIGS. 2-9, drop receiving device 120 may be configured to receive a fiber drop without requiring access to unit 115 and without requiring additional installation personnel.

Each drop receiving device 120 may be serviced by a corresponding conduit 125-1 to 125-6 (collectively "conduits 125" or individually "conduit 125") for facilitating deliver of a fiber drop from service provision location 130 to each unit 115. As illustrated, depending on a location of unit 115 relative to service provision location 130, conduits 125 may extend hundreds of feet in length and may include multiple bends.

In some implementations, service provision location 130 may be provided in a centralized location relative to units 115. Alternatively, service provision location 130 may be provided at a common building access point for building service providers, such as a basement or utility room(s). In yet other implementations, multiple service provision locations 130 may be provided for selected ones of units 115, such as a first service provision location 130 for a first group of units 115 and a second service provision location 130 for a second group of units 115.

A single multi-unit building 110, six units 115, six drop receiving devices 120, six conduits 125, and a single service provision location 130 have been illustrated in FIG. 1 for simplicity. In practice, there may be more or less multi-unit buildings, units, drop receiving devices, conduits, and service provision locations. For example, a single floor of a building may include multiple units (e.g. cubicles), where each unit may include a conduit and a drop receiving device, and the service provision location may be located on the single floor.

Figure 2:
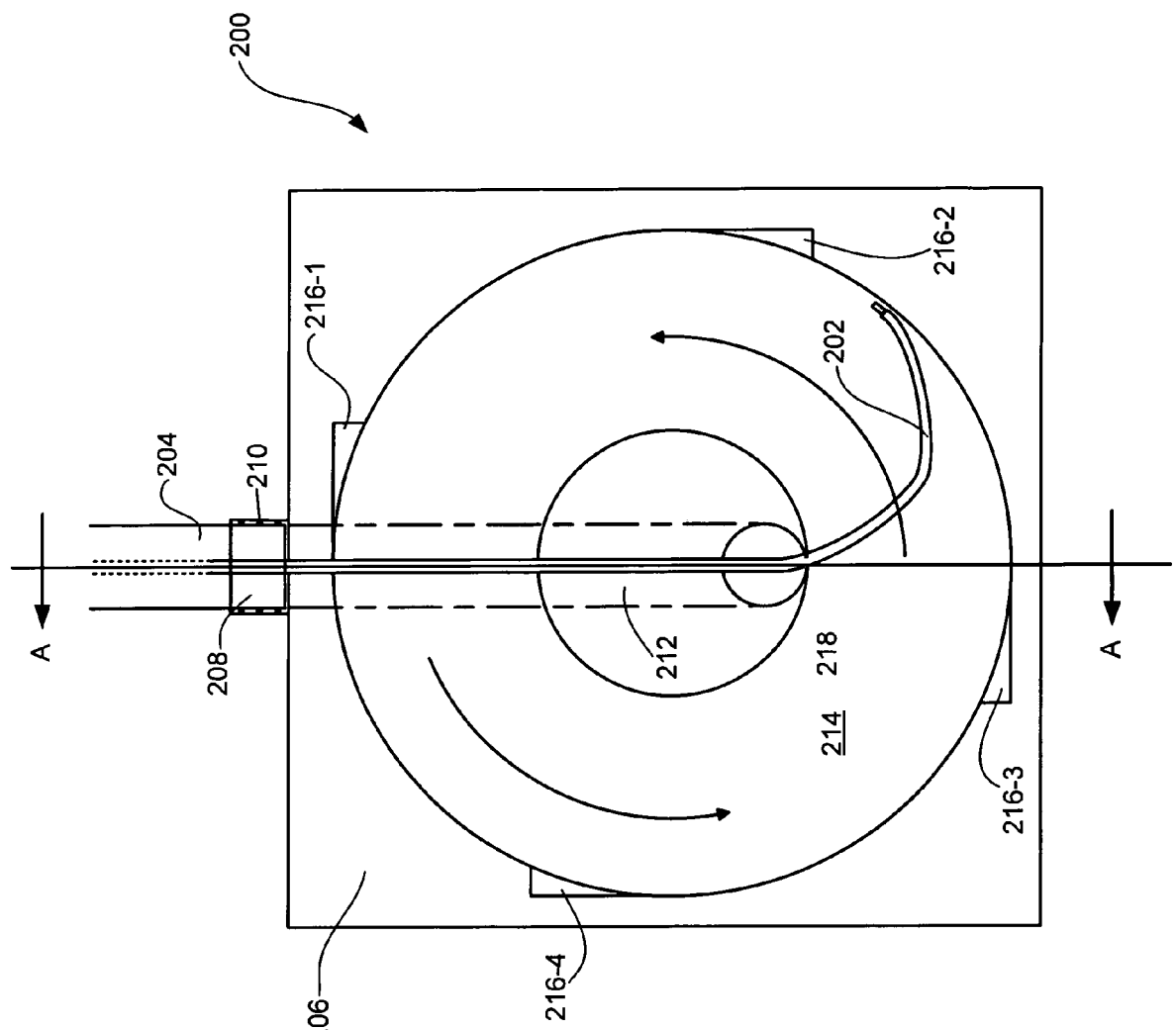
FIG. 2 is a schematic diagram of a front view of the drop receiving device of FIG. 1.

FIG. 2 is a schematic view illustrating an exemplary implementation of a drop receiving device 200 for use with application environment 100 of FIG. 1. In the embodiment of FIG. 2, drop receiving device 200 may facilitate efficient installation of a fiber drop 202 by receiving fiber drop 202 and flow of air via an installation conduit or duct 125. In one exemplary implementation, conduit 125 may include a microduct 204 having an outside diameter ranging from approximately 8.5 mm to about 12.7 mm.

In one implementation consistent with embodiments described herein, drop receiving device 200 may include an outer housing 206, a duct entry port 208, a duct seal(s) 210, a fiber/air flow receiving channel 212, a drop receiving cylinder 214, and a number of air escape ports 216-1 to 216-4 (collectively, "air escape ports 216" and individually, "air escape port 216"). Additional components and details relating to drop receiving device 200 are set forth in additional detail below. Consistent with embodiments described herein, microduct 204 may be configured to receive fiber drop 202 and a source of pressurized air from, for example, service provision location 130. Pressurized air may be used to assist in insertion of the fiber drop 202 by reducing friction in microduct 204.

As illustrated, outer housing 206 of drop receiving device 200 may be formed in a substantially rectangular or box-like configuration. In one implementation drop receiving device 200 may include a two-part housing assembly that includes outer housing 206 and a back plate assembly (shown at element 310 in FIGS. 3A, 3B, and 4A-4C). Outer housing 206 may be releasably connected to back plate assembly 310 by any of a variety of fastening mechanisms, such as screws, clips, bolts, etc. Outer housing 206 as well as back plate assembly 310 may be formed of any suitable material and in any suitable manner, such as by injection molded plastic, welded aluminum or steel sheets, etc. Removing outer housing 206 from back plate assembly 310 may facilitate opening of drop receiving device 200 and removal of drop 202 from drop receiving cylinder 214.

Duct entry port 208 may engagably receive microduct 204 and may provide access to fiber/air flow receiving channel 212. In one implementation, duct entry port 208 may have a substantially cylindrical configuration designed to receive a substantially cylindrical outer surface of microduct 204. Duct entry port 208 may include one or more duct seals 210 to reduce the amount of air that may escape from duct entry port 208 upon installation of drop 202. In one embodiment, duct seals 210 may include a number of "O"-rings formed of a resilient material (e.g., rubber or plastic). Alternatively, an entire inner surface of duct entry port 208 may be configured as a resilient, sealing material.

Fiber/air flow receiving channel 212 may be configured to receive fiber drop 202 and a flow of pressurized air from microduct 204. During installation of drop 202, pressurized air may be provided within conduit to reduce an effect of friction during the drop installation process. Traditionally, the air used to assist during movement of drop 202 through microduct 204 is left to escape from an end of microduct 204.

In accordance with embodiments described herein, the flow of pressurized air may be used to drive a rotation of drop receiving cylinder 214, thereby assisting in reception and storage of fiber drop 202 upon exit from microduct 204. As shown in FIG. 2, fiber/air flow receiving channel 212 may include an outlet 218 that enables the pressurized air and drop 202 to enter drop receiving cylinder 214.

As illustrated, drop receiving cylinder 214 may be rotatably mounted in outer housing 206 and may include a substantially cylindrical cross-section and escape ports 216. Upon receipt of drop 202 and the flow of pressurized air, the air entering cylinder 214 may be directed out of escape ports 216 extending tangentially from the periphery of drop receiving cylinder 214, thereby causing drop receiving cylinder 214 to rotate in a direction opposite to the escaping air flow. In the embodiment illustrated in FIG. 2, since escape ports 216 are directed in a clockwise direction, drop receiving cylinder 214 will rotate in a counter-clockwise direction upon application of pressurized air from fiber/air flow receiving channel 212. It should be understood that the direction of escape ports 216 and, therefore, rotation of drop receiving cylinder may be reversed in alternate implementations. Upon rotation of drop receiving cylinder 214, the portion of fiber 202 extending into drop receiving cylinder 214 will wind in a counter-clockwise fashion, following the rotation of drop receiving cylinder 214. Drop receiving cylinder 214 may be sized to accept a predetermined length of optical fiber sufficient to provide service to unit 115.

Although drop receiving device 200 has been illustrated as including a variety of components and/or structures, it should be understood that these components and structures are not limiting and that any suitable combination of components and/or structures may be used.

FIG. 3A is an exploded schematic diagram illustrating an exemplary implementation of a drop receiving device 200 taken along the line "A-A" of FIG. 1. As illustrated, drop receiving device 200 may be formed of outer housing 206, a cup 302, a pin 304, a cylinder cover 306, a shield or fence 308, drop receiving cylinder 214, and back plate assembly 310.

As illustrated in FIG. 3A, outer housing 206 may have a substantially box-shaped configuration including walls 312 and top 314. As shown in additional detail below with respect to FIGS. 8B and 8C, walls 312 of outer housing 206 may include openings 316 configured to receive clip elements 318 of back plate assembly 310. Outer housing 206 may include a pin receiving element 320 substantially centered within top 314 of outer housing and configured to receive one end of pin 304.

Cup 302 may have a substantially cylindrical configuration including a wall 322 and a top 324. Cup 302 may include a pin hole 326 configured to receive pin 304, thereby centering cup 302 relative to outer housing 206.

Cylinder cover 306 may include a substantially disc-shaped outer section 328 integrally formed with a cup-shaped inner section 330. In one implementation, an outer surface 332 of inner section 330 may be configured to lie adjacent to outlet 218 of fiber/air flow receiving channel 212. Furthermore, cup-shaped inner section 330 may include a pin hole 334 configured to receive pin 304, thereby cylinder cover 306 relative to outer housing 206. Additionally, outer section 328 may include a lip 336 configured to engage an outer surface 338 of drop receiving cylinder 214. Cylinder cover 306 may be configured to close a top surface of drop receiving cylinder 214 and prevent or limit air flow out of drop receiving cylinder 214, except through escape ports 216.

Shield/fence 308 may include a substantially disc-shaped outer section 340 and an inner opening 342 sized to enable reception of an inner portion of drop receiving cylinder 214. In one implementation, shield/fence 308 may include ventilation holes or other openings (described below in connection with FIG. 5B) and may be configured to prevent the received drop from inhibiting air flow to escape ports 216. As illustrated in assembled drop receiving device 200 of FIG. 3B, shield/fence 308 may be configured to surround an inner portion of drop receiving cylinder 214 on top of escape ports 216, thereby providing a receiving surface for drop 202 that does not prevent air from reaching escape ports 216.

Drop receiving cylinder 214 may include outer surface 338 having a substantially cylindrical configuration. An open end of outer surface 338 may include a clip or engagement mechanism 344 for removeably engaging lip 336 of cylinder cover 306. Drop receiving cylinder 214 may include an inner portion 346 having a raised center section. Further, as discussed above, drop receiving cylinder 214 may include a number of air escape ports 216 (ports 216-1 and 216-3 are shown in FIG. 3A).

Back plate assembly 310 may include a substantially square plate-like outer surface 350 having a number of raised clip elements clip elements protruding therefrom. Back plate assembly 310 may include a raised element 352 for housing fiber/air flow receiving channel 212 and connecting to duct entry port 208. Back plate assembly 310 may further include a raised cylindrical portion 354 configured to receive fiber/air flow receiving channel 212 and may include outlet 218 described above in relation to FIG. 2. Raised cylindrical portion 354 may include a notch 356 configured to receive and center drop receiving cylinder 214. In one implementation, raised cylindrical portion 354 may also include a pin receiving cavity 358 for receiving an end of pin 304.

FIG. 3B is a schematic diagram illustrating an exemplary implementation of an assembled drop receiving device 200 taken along the line "A-A" of FIG. 1.

FIG. 4A is a schematic diagram illustrating an exemplary implementation of back plate assembly 310 of FIG. 3A. FIG. 4B is a schematic diagram illustrating an exemplary implementation of back plate assembly 310 of FIG. 3A taken along the line "B-B" of FIG. 4A. FIG. 4C is a schematic diagram illustrating an exemplary implementation of back plate assembly 310 of FIG. 3A taken along the line "C-C" of FIG. 4B. As illustrated in FIGS. 4B and 4C, raised element 352 may extend radially from raised cylindrical portion 354 to duct entry port 208.

FIG. 5A is a schematic diagram illustrating an exemplary implementation of shield 308 of FIG. 3A. FIG. 5B is a schematic diagram illustrating an exemplary implementation of shield 308 of FIG. 3A taken along the line "D-D" of FIG. 5A. As illustrated, disc-shaped outer section 340 may include a plurality of ventilation holes 502 for facilitating release of air from drop receiving cylinder 214.

FIG. 6A is a schematic diagram illustrating an exemplary implementation of drop receiving cylinder 214 of FIG. 3A. FIG. 6B is a schematic diagram illustrating an exemplary implementation of drop receiving cylinder 214 of FIG. 3A taken along the line "E-E" of FIG. 6A. As illustrated, drop receiving cylinder 214 may include clips or other engagement mechanisms 344 located at opposite sections of outer surface 338.

Figure 7B:
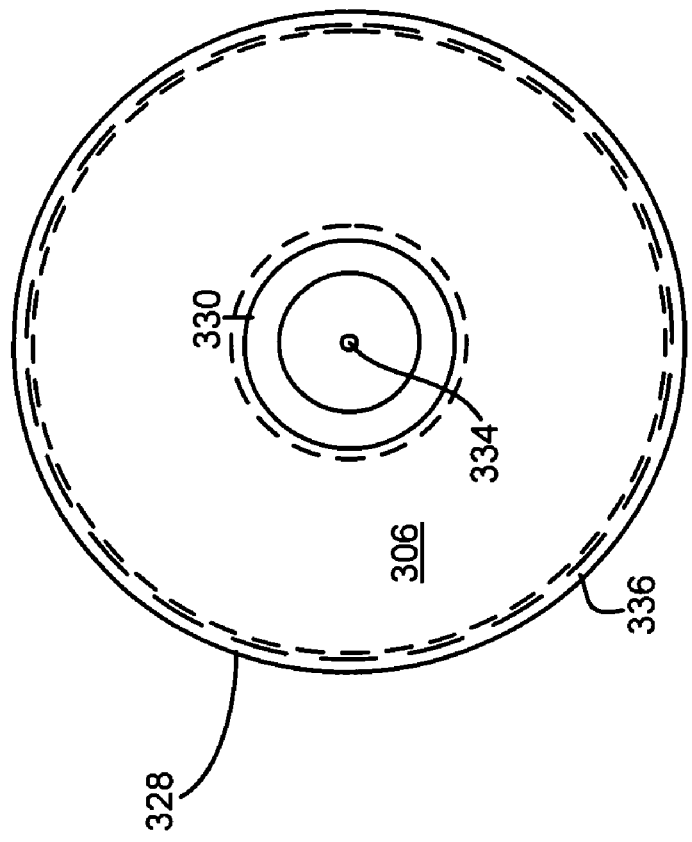
FIG. 7B is a schematic diagram of the cylinder cover of FIG. 7A taken along the line "F-F"
Figure 7A:
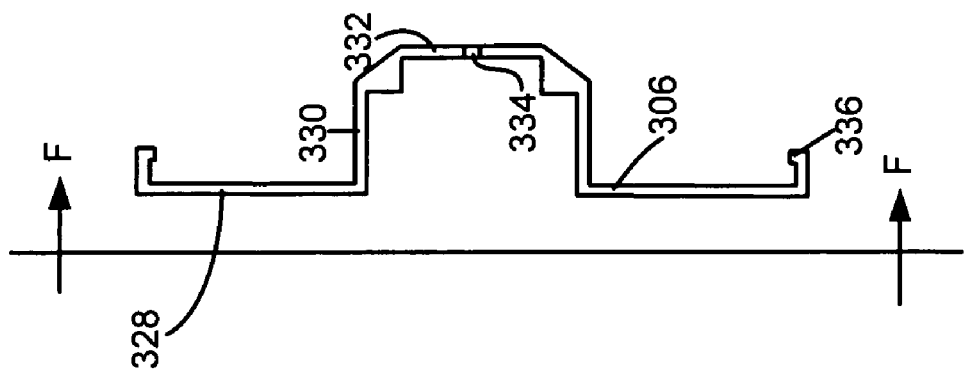
FIG. 7A is a schematic diagram of the cylinder cover of FIG. 3A.

FIG. 7A is a schematic diagram illustrating an exemplary implementation of cylinder cover 306 of FIG. 3A. FIG. 7B is a schematic diagram illustrating an exemplary implementation of cylinder cover 306 of FIG. 3A taken along the line "F-F" of FIG. 7A.

FIG. 8A is a schematic diagram illustrating an exemplary implementation of outer housing 206 of FIGS. 2 and 3A. FIG. 8B is a schematic diagram illustrating an exemplary implementation of outer housing 206 of FIG. 8A taken along the line "G-G" of FIG. 8A. FIG. 8C is a schematic diagram illustrating an exemplary implementation of outer housing 206 of FIG. 8A taken along the line "H-H" of FIG. 8A. As illustrated, outer housing 206 may include openings 316 configured to receive clip elements 318 of back plate assembly 310. Additionally, outer housing 206 may include opening 810 configured to receive raised element 352 of back plate assembly 310.

Figure 9:
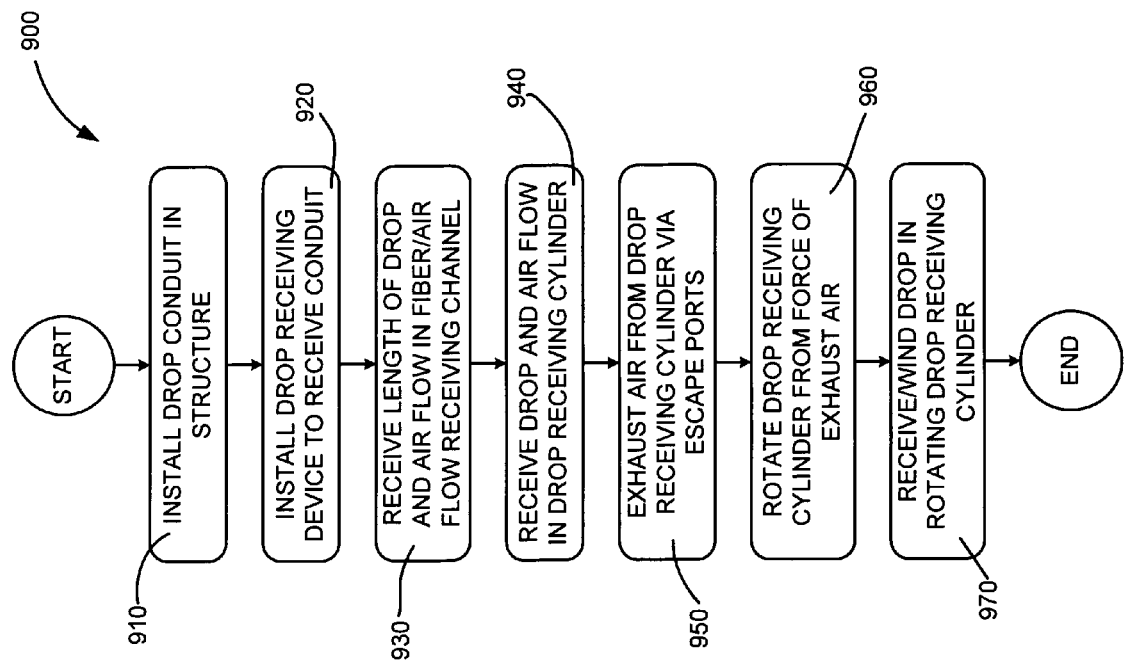
FIG. 9 is a flow diagram illustrating an exemplary process for installing a fiber drop in the application environment of FIG. 1 using the drop receiving device of FIG. 2.

FIG. 9 is a flow diagram illustrating an exemplary process 900 for receiving a fiber drop in the application environment of FIG. 1 using the drop receiving device of FIGS. 2-8C. The process may begin with installation of a drop conduit or duct within a structure being serviced (block 910). For example, at the time of initial construction, or during service deployment, conduit 125 may be installed in building 110 and unit 115, with the conduit terminating at a drop terminating location.

Drop receiving device 200 may be installed at the drop terminating location (e.g., a utility room/closet in unit 115 of multi-unit building 110) (block 920). As shown above in FIG. 2, drop receiving device 200 may include duct entry port 208 for receiving conduit 125.

Drop installation may commence upon receipt of a length of drop and a flow of pressurized air from conduit 125 into fiber/air flow receiving channel 212 (block 930). The air flow and inserted drop may leave fiber/air flow receiving channel 212 through outlet 218, and enter drop receiving cylinder 214 (block 940). Air flow entering drop receiving cylinder 214 may exit drop receiving cylinder 214 via escape ports 216 (block 950). The force of the air leaving drop receiving cylinder 214 via escape ports 216 may cause drop receiving cylinder 214 to rotate in an opposite direction around pin 304 (block 960). Rotation of drop receiving cylinder 214 during insertion of the drop may cause the drop to advance into drop receiving cylinder 214 and wind in a direction following the rotation of drop receiving cylinder 214 (block 970).

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of blocks have been described with regard to FIG. 9, the order of the blocks may be modified in other implementations. Further, non-dependent blocks may represent blocks that can be performed in parallel. For example, blocks 900 and 920 may be performed in parallel or in any suitable order.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
    a housing assembly including a duct entry port for receiving a drop conduit; and
    a drop receiving cylinder rotatably mounted in the housing assembly and connected to the duct entry port,
        where the drop receiving cylinder is configured to receive a fiber drop and a flow of pressurized air from the duct entry port,
        where the drop receiving cylinder includes an escape port for providing an outlet for the flow of pressurized air, where the flow of pressurized air through the escape port causes the drop receiving cylinder to rotate within the housing assembly, and where rotation of the drop receiving cylinder enables winding of the received fiber drop inside the drop receiving cylinder.

2. The device of claim 1, where the housing assembly further comprises:

an outer housing; and a back plate assembly removeably connected to the outer housing, where the back plate assembly is configured to include the duct entry port and a receiving channel for passing the fiber drop and the flow of pressurized air to the drop receiving cylinder.

3. The device of claim 2, where the receiving channel includes an outlet communicating with the drop receiving cylinder.

4. The device of claim 3, where the back plate assembly further comprises:

a first section configured to include the receiving channel; and a second section connected to the first section, where the second section is configured to house the outlet and provide an axis for the rotation of the drop receiving cylinder.

5. The device of claim 1, where the drop receiving cylinder includes a plurality of escape ports for providing outlets for the flow of pressurized air.

6. The device of claim 5, where the shield element includes a plurality of ventilation openings.

7. The device of claim 1, further comprising:

a shield element mounted in the drop receiving cylinder and configured to prevent the received fiber drop from inhibiting the flow of pressurized air out of the escape port.

8. The device of claim 1, further comprising:

a cylinder cover configured to connect to the drop receiving cylinder, where the cylinder cover is further configured to cover the drop receiving cylinder and prevent the flow of pressurized air from escaping from the drop receiving cylinder except through the escape port.

9. The device of claim 8, where the drop receiving cylinder and the cylinder cover include an attachment mechanism for securing the cylinder cover to the drop receiving cylinder.

10. The device of claim 1, where the duct entry port comprises a substantially cylindrical shape and is sized to receive a duct for receiving the fiber drop.

11. The device of claim 10, where the duct entry port includes a duct seal for limiting air flow around the duct.

12. The device of claim 10, where the duct comprises a microduct.

13. A drop receiving device, comprising:

means for receiving a fiber drop and a flow of pressurized air from a conduit;

means for passing the fiber drop and the flow of pressurized air to a drop receiving cylinder;

means for rotating the drop receiving cylinder based on the flow of pressurized air; and means for winding the received fiber drop in the drop receiving cylinder upon rotation of the drop receiving cylinder.

14. The drop receiving device of claim 13, where the means for receiving the fiber drop and the flow of pressurized air further comprises a back plate assembly configured to include a duct entry port sized to receive the conduit.

15. The drop receiving device of claim 14, where the means for passing the fiber drop and the flow of pressurized air to the drop receiving cylinder further comprises a receiving channel included in the back plate assembly.

16. The drop receiving device of claim 14, where the drop receiving cylinder is rotatably mounted on the back plate assembly.

17. The drop receiving device of claim 14, where the means for rotating the drop receiving cylinder based on the flow of pressurized air further comprises:

a plurality of escape ports located on a periphery of the drop receiving cylinder, where the plurality of escape ports are configured to exhaust the flow of pressurized air from the drop receiving cylinder, causing the drop receiving cylinder to rotate in a direction opposite to a direction of the exhausted flow of pressurized air.

18. The drop receiving device of claim 17, further comprising:

means for preventing the flow of pressurized air from escaping the drop receiving cylinder except through the plurality of escape ports.

19. A method, comprising:

receiving a drop in a drop receiving cylinder;

receiving a flow of pressurized air in the drop receiving cylinder;

advancing the drop into the drop receiving cylinder;

rotating the drop receiving cylinder based on the flow of pressurized air; and winding the advancing drop in the rotating drop receiving cylinder.

20. The method of claim 19, where the drop and the flow of pressurized air are received from a single conduit.

21. The method of claim 19, where rotating the drop receiving cylinder based on the flow of pressurized air, further comprises:

rotatably mounting the drop receiving cylinder in a housing;

exhausting the received flow of pressurized air out of an exhaust port located on a periphery of the drop receiving cylinder; and rotating the drop receiving cylinder within the housing in a direction opposite to a direction of the exhausted flow of pressurized air.

22. The method of claim 21, further comprising:

preventing air from escaping the drop receiving cylinder, except through the exhaust port.

23. The device of claim 1, where the housing assembly includes a substantially box-like configuration.

* * * * *